(12) United States Patent
Bohling et al.

(10) Patent No.: US 9,006,365 B2
(45) Date of Patent: Apr. 14, 2015

(54) METHOD OF MAKING POLYMERIC BEAD FROM PHOSPHOROUS ACID CONTAINING MONOMERS

(75) Inventors: James C. Bohling, Lansdale, PA (US); Jose Antonio Trejo-O'Reilly, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 526 days.

(21) Appl. No.: 13/339,480

(22) Filed: Dec. 29, 2011

(65) Prior Publication Data

US 2012/0172561 A1 Jul. 5, 2012

Related U.S. Application Data

(60) Provisional application No. 61/428,940, filed on Dec. 31, 2010.

(51) Int. Cl.
*C08F 230/02* (2006.01)
*C08F 2/20* (2006.01)

(52) U.S. Cl.
CPC .............. *C08F 2/20* (2013.01); *C08F 230/02* (2013.01)

(58) Field of Classification Search
USPC ........................................................ 526/277
See application file for complete search history.

(56) References Cited

U.S. PATENT DOCUMENTS

| 3,726,839 | A | * | 4/1973 | Jin ................................ 526/278 |
| 3,943,085 | A | | 3/1976 | Kraft et al. |
| 4,110,285 | A | | 8/1978 | Pons et al. |
| 4,147,853 | A | | 4/1979 | Goswami et al. |
| 4,486,313 | A | | 12/1984 | Meitzner et al. |
| 4,733,005 | A | | 3/1988 | Schmidt et al. |
| 4,954,399 | A | | 9/1990 | Tani et al. |
| 5,116,882 | A | * | 5/1992 | Grey et al. ..................... 521/147 |
| 6,080,802 | A | | 6/2000 | Emmons et al. |
| 6,492,451 | B1 | | 12/2002 | Dersch et al. |
| 6,534,597 | B2 | | 3/2003 | Adam et al. |
| 6,710,161 | B2 | | 3/2004 | Bardman et al. |
| 2003/0236374 | A1 | * | 12/2003 | Bardman et al. .............. 526/274 |

FOREIGN PATENT DOCUMENTS

| CA | 1116790 A | | 1/1982 | |
| GB | 958856 | | 5/1964 | |
| JP | 58/125713 | * | 7/1982 | ............ C08F 230/02 |
| JP | 58-125713 A | | 7/1983 | |

OTHER PUBLICATIONS

Yuan, "Suspension Polymerization", J. Macromolecular Science, Part C, v. 31, pp. 215-299 (1991).

* cited by examiner

*Primary Examiner* — Ling Choi
*Assistant Examiner* — Chun-Cheng Wang
(74) *Attorney, Agent, or Firm* — Carl P. Hemenway; Tifani M. Edwards

(57) ABSTRACT

The present invention is a method for making a polymeric bead by suspension polymerization processes from a phosphoric acid monoester.

20 Claims, No Drawings

METHOD OF MAKING POLYMERIC BEAD FROM PHOSPHOROUS ACID CONTAINING MONOMERS

The present invention is a method for making a polymeric bead by suspension polymerization processes from a phosphorous acid containing monomers.

Various monomers have been polymerized in the art to make polymeric beads. Typically the processes to make these polymeric beads are laborious and require expensive monomer materials. Additionally when a functional polymer is desired additional functionalization steps are often needed to functionalize the resultant polymer. This adds to the expense, waste generation and inefficiency of the polymer manufacturing process.

To attempt to minimize waste and solve these problems of cost and inefficiency in a single step process, a class of monomers, has been used in the art that does not need the additional steps of functionalization because the monomer itself contains the functional groups. Phosphorous acid containing monomers, such as phosphoalkyl methacrylate ester have been used for this purpose. Typically these monomers are polymerized by an emulsion polymerization method as disclosed in U.S. Pat. No. 4,110,285. The emulsion polymerized materials typically have very low levels of acid containing monomers and cross-linking monomers. The problem with this method is that it produces polymeric beads having an average particle size of less than 1 μm. Some applications require the use of large beads or polymers formed having an average particle size greater than 30 μm.

The present invention solves this problem by providing a method of making improved polymeric beads wherein the acid monomer of phosphoalkyl methacrylate ester is polymerized by suspension polymerization while producing beads having an average particle size of greater than 30 μm.

The present invention provides a process for preparing polymeric beads which comprises:
i) forming a suspension,
wherein the suspension comprises at least one phosphorus-containing acid monomer an aqueous medium, a free-radical initiator and a suspending agent;
ii) and allowing the monomers to polymerize until they have formed water-insoluble polymeric beads.

The monomer useful in the present invention to make improved polymeric beads is a phosphorus-containing acid monomer, the monomer containing at least one ethylenic unsaturation and a phosphorus acid group. The phosphorus-containing acid monomer may be in the acid form or as a salt of the phosphorus acid groups. Examples of phosphorus acid monomers include:

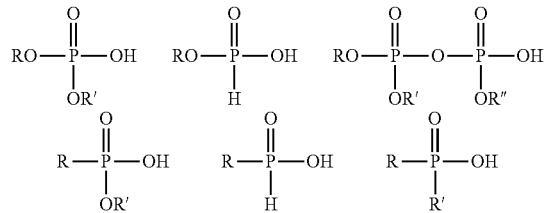

wherein R is an organic group containing an acryloxy, methacryloxy, styryl, aryl, or a vinyl group; and R' and R" are independently selected from H and a second organic group. The second organic group may be saturated or unsaturated.

Suitable phosphorus acid monomers include dihydrogen phosphate-functional monomers such as dihydrogenphosphate esters of an alcohol in which the alcohol also contains a polymerizable vinyl or olefinic group, such as allyl phosphate, mono- or diphosphate of bis(hydroxy-methyl) fumarate or itaconate, derivatives of (meth)acrylic acid esters, such as, for examples phosphates of hydroxyalkyl(meth)acrylates including 2-hydroxyethyl (meth)acrylate, 3-hydroxypropyl (meth)acrylates, and the like. Other suitable phosphorous acid monomers include $CH_2=C(R)-C(O)-O-(R1O)_n-P(O)(OH)_2$, where R=H or CH3 and R1=alkyl, such as SIPOMER™ PAM-100, SIPOMER™ PAM-200, SIPOMER™ PAM-300, and SIPOMER™ PAM-4000, available from Rhodia, Inc. Other suitable phosphorus acid monomers are phosphonate functional monomers, disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus functional monomers are Harcross T-Mulz 1228 and 1,2-ethylenically unsaturated (hydroxy)phosphinylalkyl (meth)acrylate monomers, disclosed in U.S. Pat. No. 4,733,005, and include (hydroxy)phosphinylmethyl methacrylate. Preferred phosphorus acid monomers are dihydrogen phosphate monomers, which include 2-phosphoethyl (meth)acrylate, 2-phosphopropyl (meth)acrylate, 3-phosphopropyl (meth)acrylate, and 3-phospho-2-hydroxypropyl (meth)acrylate. Preferred are 2-phosphoethyl (meth)acrylate, 2-phosphopropyl (meth)acrylate, 3-phosphopropyl (meth)acrylate, 3-phospho-2-hydroxypropyl (meth)acrylate, SIPOMER™ PAM-100, and SIPOMER™ PAM-200.

In the present invention, the acid monomer can be polymerized in its original form. Preferably the acid monomer is in protonated form. Alternatively the phosphorus-containing acid monomer may be complexed with metals prior to polymerization. For example a metal may be complexed with the phospho moiety of the acid monomer. The phosphorus-containing acid monomer of the present invention could be in the protonated acid form prior to polymerization or the phosphorus-containing acid monomer complexed with metal prior to polymerization. The metal complexed monomers employ a multivalent metal ion which binds more than one phosphate containing monomer. This phosphorus-containing acid monomer is present in an amount ranging from 20-99.9%, alternatively from 40-99.9%, and further alternatively 70-99.9% by weight of the total monomeric mixture. One particularly suitable phosphorus-containing acid monomer within this broad class of monomers of the present invention is the acid monomer phosphoethyl methacrylate.

Crosslinking monomers useful in the present invention include both water-insoluble multiethylenically unsaturated monomers, including: aromatic crosslinkers such as divinylbenzene, trivinylbenzene, divinylnaphthalene, divinyltoluene, divinylchlorobenzene, diallyl phthalate, divinylxylene, divinylethylbenzene, trivinylnaphthalene and polyvinylanthacenes; non aromatic crosslinkers such as diethyleneglycol divinyl ether, trimethylolpropane trimethacrylate, diethylene glycol divinyl ether, diethylene glycol dimethacrylate, ethylene glycol diacrylate, neopentyl glycol dimethacrylate, pentaerythritol tetra- and trimethacrylates, allyl acrylate, divinyl ketone, N,N'-methylenediacrylimide, N,N'-methylenedimethacrylimide, N,N'-ethylenediacrylimide, diallyl maleate, diallyl fumarate, diallyl succinate, diallyl carbonate, diallyl malonate, diallyl oxalate, diallyl adipate, diallyl sebacate, diallyl tartrate, diallyl tricarballylate, triallyl aconitate, triallyl citrate; the polyallyl and polyvinyl ethers of glycol, glycerol and pentaerythritol; aralkyl crosslinking monomers such as bisphenol-A dimethacrylate, and the polyallyl and polyvinyl ethers of resorcinol; and mixtures thereof. Preferred crosslinking monomers are divinylbenzene, trimethylolpropane trimethacrylate, trimethylolpropane triacrylate, hexamethylene-bis-methacrylamide and diethylene glycol divinyl ether, and mixtures thereof. The crosslinking monomers herein expressly exclude phosphorus containing multiethylenically unsaturated monomers such as multiethylenically unsaturated PEM diesters, and the like. The crosslinking monomers are present at a level from 0 to 30%, alternatively from 2-20% and further alternatively from 4 to 10%, by weight, of the total monomer mixture.

Other monoethylenically unsaturated monomers may be present in a minor amount in the monomer mixture. The non-water-soluble monomers useful in the present invention include those which are copolymerizable with the combination of the acid monomer and the crosslinking monomer. These include both aromatic and aliphatic monomers having monoethylenic unsaturation, including those which are substituted with functional groups other than the ethylenic groups. A single type or combination of other monomethylenically unsaturated monomers may be present.

Polymerization initiators useful in the present invention include monomer-soluble initiators such as peroxides, hydroperoxides and related initiators, for example benzoyl peroxide, tert-butyl hydroperoxide, cumene peroxide, tetralin peroxide, acetyl peroxide, caproyl peroxide, tert-butyl perbenzoate, tert-butyl diperphthalate and methyl ethyl ketone peroxide. Also useful are di(4-tert-butyl-cyclohexyl) peroxidicarbonate and azo initiators such as azodiisobutyronitrile, azodiisobutyramide, 2,2'-azo-bis-(2,4-dimethylvaleronitrile), azo-bis-($\alpha$methylbutyronitrile) and dimethyl, diethyl or dibutyl azo-bis-(methylvalerate). The preferred initiator is di(4-tert-butyl-cyclohexyl)peroxidicarbonate. The initiators are preferably used at a level of from 0.01 to 5% by weight, alternatively from 0.01% to 3% by weight, and preferably from 0.01% to 2% by weight, based on the total weight of the monomers. Combinations of initiators may be used.

Salts useful for reducing solubility of the water-soluble monomer in the aqueous phase are water-soluble, non-reactive inorganic salts including water-soluble, non-reactive inorganic salts of a monovalent, divalent or aluminum cation and a monovalent or divalent anion, for example sodium, potassium, lithium and ammonium salts of chloride, bromide, iodide, sulfate, carbonate and nitrate, and the magnesium and calcium salts of chloride, bromide, iodide and nitrate. Preferred salts are sodium chloride, sodium sulfate and sodium nitrate. The salt is dissolved in the aqueous medium at levels from 5 weight percent, based upon the total weight of the aqueous phase, to saturation of the salt in the aqueous phase. The term, "non-reactive", as applied to the salts herein, means that the salt does not react chemically with water, the monomers or the polymers formed from the monomers.

Dispersants or suspending agents useful in the present invention are nonionic surfactants. Examples of such suitable nonionic surfactants include but are not limited to partially hydrolyzed polyacrylamide, polyvinyl alcohol, kaolin, tricalcium phosphate, hydroxyalkyl cellulose, and the like, and mixtures thereof.

The process of the present invention comprises forming a suspension of the monomer mixture, including the acid monomer and from 0 to 30 weight percent, based on the total monomer weight, of crosslinking monomer, and optionally a second monoethylenically unsaturated monomer, in an aqueous medium containing from 5 weight percent to saturation of water-soluble, non-reactive inorganic salt in the presence of free-radical initiator, for example from 0.1 to 5 weight percent of monomer-soluble, free-radical initiator, and from 0.01 to 4 weight percent of nonionic surfactant-type dispersant; establishing polymerization conditions in the suspension, and allowing the monomers to polymerize until they have formed water-insoluble particles. The water-insoluble particles may then be separated from the aqueous phase.

The monomer phase forms spherical droplets within the aqueous phase; these are preferably kept suspended by agitation, but other techniques for maintaining suspension which will be readily apparent to those skilled in the art may be employed, for example using a static mixer, or suspending the droplets in a liquid stream moving opposite to the direction in which the droplets tend to move by their density. The polymerization reaction occurs within the suspended monomer droplets, and is initiated by establishing a temperature in the droplet which is at least as great as a decomposition temperature of the polymerization initiator which will allow polymerization of the monomers to occur. A reasonable lower temperature for polymerization is about 40° C.; one skilled in the art will realize that if an initiator is selected having a higher decomposition temperature, the minimum temperature will be chosen according to the decomposition temperature of the actual initiator used. The upper limit for the polymerization reaction is the boiling temperature of the suspending medium; the medium employed herein is aqueous, so at atmospheric pressure the maximum temperature will be 100° C., and higher temperatures may be used at higher pressures. A lower temperature may be advantageous to prevent decomposition of one or more of the monomers or the dispersant, or for other reasons which will be apparent to one skilled in the art.

The process of the present invention may be used for preparing both gel and macroporous resins. For the preparation of macroporous resins a porogen is commonly used. Porogens are substances in which the monomers are soluble but the resulting polymer is insoluble, and which will dissolve the monomers within the suspended droplet, without reacting with the other components of the polymerization mixture. Thus, for the present process, sufficient porogen must remain within the suspended droplet to dissolve the monomer mixture at least partially, and to create the pores within the particle as the polymer forms Examples of useful porogens include, e.g., $C_7$-$C_{10}$ hydrocarbons, $C_3$-$C_{10}$ halogenated hydrocarbons, $C_4$-$C_{10}$ ketones, $C_3$-$C_{10}$ alcohols and combinations thereof. Especially preferred porogens include methyl isobutyl ketone (MIBK), diisobutyl ketone (DIBK), methyl isobutyl carbinol (MIBC), 1,2-dichloropropane, toluene (tol), xylenes, isooctane, chlorobenzene and n-butyl acetate. When the resin beads of the present invention are macroporous they have a resultant average particle size of from 30 μm to 1000 μm, preferably from 300 to 800 μm, more preferably from 400 to 700 μm.

The following Examples are presented to illustrate representative embodiments of the present invention. All ratios and percentages given herein are by weight unless otherwise specified, and all reagents used in the examples are of good commercial quality unless otherwise specified.

EXAMPLES

Example 1

In a 2 liter laboratory reactor 390 g deionized water, 138 g NaCl, 2.6 g of sodium carboxymethyl cellulose were charged under stirring condition at 200 rpm. In a monomer preparation tank 150 g of Glacial Methacrylic Acid (GMAA), 150 g of PEM, 24 g of Divinyl Benzene (63%) (DVB) and 5.8 g of di(4-tert-butyl-cylcohexyl) peroxidicarbonate were added. The agitation was stopped in the polymerization reactor and the monomer mix was charged to the reactor. The reactor was then stirred at 150 rpm during the run. The temperature profile was room temperature for 30 minutes, heated to 58° C. and held for 5 hours and then heated to 97° C. and held for 3 hours. The reaction was then cooled down to room temperature. The lot was washed with excess water, screened, Buchner dried and packed.

Example 2

In a 2 liter laboratory reactor 390 g deionized water, 138 g NaCl, 2.6 g of sodium carboxymethyl cellulose were charged under stirring condition at 200 rpm. In a monomer preparation tank 150 g of Glacial Methacrylic Acid (GMAA), 150 g of PEM, 24 g of Divinyl Benzene (63%) (DVB) and 5.8 g di(4-tert-butyl-cylcohexyl) peroxidicarbonate was added. The agitation was stopped in the polymerization reactor and the monomer mix was charged to the reactor. The reactor was then stirred at 250 rpm for 30 minutes and then heated to 58° C. and held for 5 hours and then heated to 97° C. and held for 3 hours. The reaction was then cooled down to room temperature. The lot was washed with excess water, screened, Buchner dried and packed.

Example 3

In a 2 liter laboratory reactor 390 g deionized water, 138 g NaCl, 2.6 g of sodium carboxymethyl cellulose were charged under stirring condition at 200 rpm. In a monomer preparation tank 50 g of Glacial Methacrylic Acid (GMAA), 250 g of PEM, 12 g of Divinyl Benzene (63%) (DVB) and 5.8 g di(4-tert-butyl-cyclohexyl) peroxidicarbonate was added. The agitation was stopped in the polymerization reactor and the monomer mix was charged to the reactor. The reactor was then stirred at 150 rpm for 30 minutes and then heated to 58° C. and held for 5 hours and then heated to 97° C. and held for 3 hours. The reaction was then cooled down to room temperature. The lot was washed with excess water, screened, Buchner dried and packed.

Table from Examples 1 to 3.

|  | Moisture Hold Capacity (MHC) % | Weight Capacity (WCap.) eq/kg | Particle Size Measured by particle size analyzer (HIAC) um |
|---|---|---|---|
| Example 1 | 37% | 5.1 | 365 |
| Example 2 | 39% | 5.2 | 65 |
| Example 3 | 75% | 6.1 | 328 |

The invention claimed is:

1. A process for preparing polymeric beads which comprises:
   i) forming a suspension,
   wherein the suspension comprises at least one phosphorus-containing acid monomer, an aqueous medium, a free-radical initiator, and a suspending agent;
      wherein the suspending agent is selected from the group consisting of partially hydrolyzed polyacrylamide, polyvinyl alcohol, kaolin, tricalcium phosphate, hydroxyalkyl cellulose, and mixtures thereof;
      wherein the phosphorous-containing acid monomer has the structure

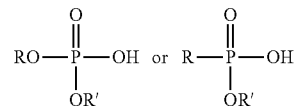

wherein R is acryloxy or methacryloxy and wherein R' is H or an organic group;
   ii) and allowing the monomers to polymerize until they have formed water insoluble polymeric beads.

2. The process of claim 1 wherein the amount of phosphorus-containing acid monomer is from 20 to 99.9 weight percent.

3. The process of claim 1 further wherein the suspension further comprises a crosslinking monomer in an amount from 0 to 30 weight percent.

4. The process of claim 1 further wherein the suspension further comprises a crosslinking monomer in an amount from 2 to 20 weight percent.

5. The process of claim 1 wherein the water insoluble polymeric beads have an average particle size of 30 to 1000 μm.

6. The process of claim 3 wherein the crosslinking monomer is selected from the group consisting of divinylbenzene, trimethylolpropane trimethacrylate, trimethylolpropane triacrylate, hexamethylene-bis-methacrylamide and diethylene glycol divinyl ether, or mixtures thereof.

7. The process of claim 4 wherein the crosslinking monomer is selected from the group consisting of divinylbenzene, trimethylolpropane trimethacrylate, trimethylolpropane triacrylate, hexamethylene-bis-methacrylamide and diethylene glycol divinyl ether, or mixtures thereof.

8. The process of claim 1 wherein the suspending agent is selected from the group consisting of partially hydrolyzed polyacrylamide, polyvinyl alcohol, hydroxyalkyl cellulose, and mixtures thereof.

9. A process for preparing polymeric beads which comprises:
   i) forming a suspension,
   wherein the suspension comprises at least one phosphorus-containing acid monomer having the structure

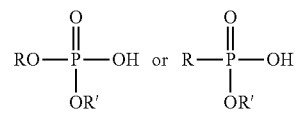

wherein R is acryloxy or methacryloxy and wherein R' is H or an organic group;
an aqueous medium, a free-radical initiator, and a suspending agent;
wherein the aqueous medium comprises from 5 weight % to saturation of a water-soluble, non-reactive inorganic salt;
   ii) and allowing the monomers to polymerize until they have formed water insoluble polymeric beads.

10. The process of claim 9, wherein the inorganic salt is a salt in which the cation is sodium, potassium, lithium, or ammonium, and the anion is chloride, bromide, iodide, sulfate, carbonate, or nitrate.

11. The process of claim 9, wherein the inorganic salt is selected from the group consisting of sodium chloride, sodium sulfate, and sodium nitrate.

12. A process for preparing polymeric beads which comprises:
i) forming a suspension,
wherein the suspension comprises at least one phosphorus-containing acid monomer having the structure

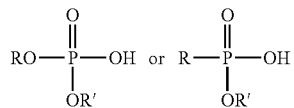

wherein R is acryloxy or methacryloxy and wherein R' is H or an organic group;
an aqueous medium, a monomer-soluble free-radical initiator, and a suspending agent;
ii) and allowing the monomers to polymerize until they have formed water insoluble polymeric beads.

13. The process of claim 12, wherein said initiator is selected from the group consisting of benzoyl peroxide, tert-butyl hydroperoxide, cumene peroxide, tetralin peroxide, acetyl peroxide, caproyl peroxide, tert-butyl perbenzoate, tert-butyl diperphthalate, methyl ethyl ketone peroxide, di(4-tert-butylcyclohexyl) peroxidicarbonate, azodisobutyronitrile, 25 azodiisobutyramide, 2,2'-azo-bis-(2,4-dimethylvaleronitrile), azo-bis(amethylbutyronitrile), dimethyl, diethyl or dibutyl azo-bis-(methylvalerate), and mixtures thereof.

14. The process of claim 12, wherein said initiator is di(4-tert-butylcyclohexyl) peroxidicarbonate.

15. The process of claim 1 wherein said phosphorous-containing acid monomer is a phosphate of a hydroxyalkyl (meth)acrylate.

16. The process of claim 1 wherein said phosphorous-containing acid monomer is a dihydrogen phosphate monomer.

17. The process of claim 9 wherein said phosphorous-containing acid monomer is a phosphate of a hydroxyalkyl (meth)acrylate.

18. The process of claim 9 wherein said phosphorous-containing acid monomer is a dihydrogen phosphate monomer.

19. The process of claim 12 wherein said phosphorous-containing acid monomer is a phosphate of a hydroxyalkyl (meth)acrylate.

20. The process of claim 12 wherein said phosphorous-containing acid monomer is a dihydrogen phosphate monomer.

* * * * *